United States Patent

[11] 3,632,307

[72] Inventors Adriaan Cornelis van Es;
  Arnoud Waller, both of Rotterdam,
  Netherlands
[21] Appl. No. 822,829
[22] Filed Apr. 9, 1969
[45] Patented Jan. 4, 1972
[73] Assignee Albatros Super Fosfaatfabrieken N.V.
  Utrecht, Netherlands
  Continuation-in-part of application Ser. No.
  576,482, Aug. 31, 1966, now abandoned.
  This application Apr. 9, 1969, Ser. No.
  822,829

[54] PROCESS FOR THE PREPARATION OF
  PHOSPHORIC ACID AND GYPSUM FROM
  PHOSPHATE ROCK
  20 Claims, 2 Drawing Figs.
[52] U.S. Cl. .................................................. 23/122,
  23/165
[51] Int. Cl. .................................................. C01f 11/46
[50] Field of Search ........................................ 23/122, 165

[56] References Cited
UNITED STATES PATENTS

| | | | |
|---|---|---|---|
| Re19,045 | 1/1934 | Larsson ....................... | 23/165 |
| 1,962,887 | 6/1934 | Ashley ......................... | 23/122 |
| 3,416,887 | 12/1968 | Matsubara et al. ........... | 23/122 |
| 3,418,077 | 12/1968 | Robinson ..................... | 23/165 |
| 3,472,619 | 10/1969 | Chelminski et al. .......... | 23/122 |

FOREIGN PATENTS

| | | |
|---|---|---|
| 621,425 | 12/1962 | Belgium |
| 697,117 | 11/1964 | Canada |

Primary Examiner—Oscar R. Vertiz
Assistant Examiner—G. O. Peters
Attorney—Waters, Roditi, Schwartz & Nissen ABSTRACT: Phosphoric acid and gypsum are prepared from phosphate rock by acidulating same with sulfuric acid or a mixture of sulfuric and phosphoric acids to form a slurry of $CaSO_4 \cdot 1/2\ H_2O$ in phosphoric acid. The $CaSO_4 \cdot 1/2\ H_2O$ is washed to remove adhered phosphoric acid and recrystallized from a solution containing phosphoric and sulfuric acids to form $CaSO_4 \cdot 2H_2O$.

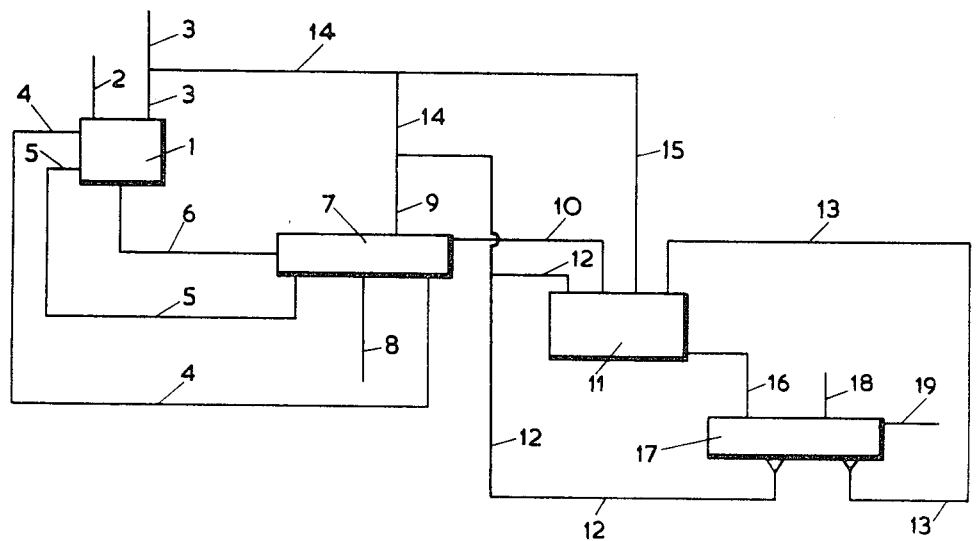
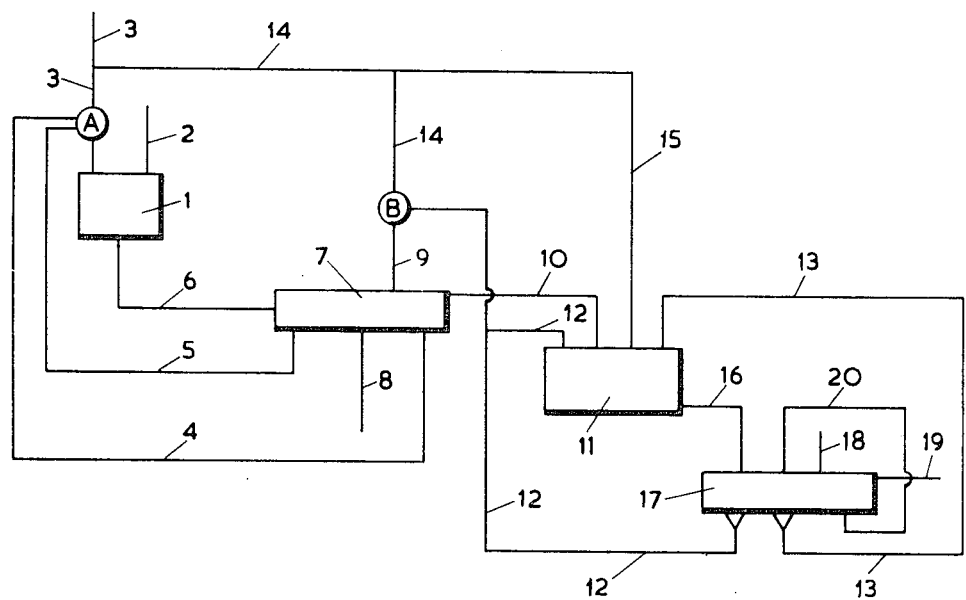

PROCESS FOR THE PREPARATION OF PHOSPHORIC ACID AND GYPSUM FROM PHOSPHATE ROCK

CROSS-REFERENCE TO RELATED APPLICATIONS

This application is a continuation-in-part of copending application Ser. No. 576,482, filed Aug. 31, 1966 now abandoned and claiming priority of Sept. 8, 1965 based on an application filed in Great Britain.

BACKGROUND OF THE INVENTION:

1. Field of the Invention

This invention relates to phosphoric acid and gypsum ($CaSO_4 \cdot 2H_2O$). In particular, the invention relates to a process for the preparation of phosphoric acid and gypsum from phosphate rock by acidulation with sulfuric acid or a mixture of sulfuric acid and phosphoric acid.

2. Prior Art

It is known that acidulation of phosphate rock with sulfuric acid or a mixture of sulfuric and phosphoric acids yields phosphoric acid and calcium sulfate. The calcium sulfate may appear in different crystal forms depending upon the reaction conditions. Thus, at high temperatures, usually between 80° and 90° C., and at a high concentration (e.g., above 30 percent) of phosphoric acid, the hemihydrate form $CaSO_4 \cdot \frac{1}{2}H_2O$ is produced. At lower temperatures, on the order of 70°–75° C., and at lower concentrations (e.g., 20 to 25 percent of phosphoric acid, the dihydrate form $CaSO_4 \cdot 2H_2O$ (gypsum), is produced.

If acidulation conditions favoring the formation of gypsum are employed, it is found that the crystals of gypsum contain a considerable amount of $CaHPO_4 \cdot 2H_2O$ which is isomorphous with gypsum, crystallizing in the same lattice. These conditions therefore produce a gypsum of unduly high-phosphate content with a corresponding decrease in the simultaneous yield of phosphoric acid. These losses may be reduced by increasing the concentration of sulfate ion in the reaction mixture, but this leads to a high-sulfate contamination of the phosphoric acid obtained and to gypsum with poor filtration characteristics.

According to the prior art, it has therefore been proposed to conduct the acidulation of phosphate rock under conditions such that the calcium sulfate is produced initially in the hemihydrate form, and to thereafter convert the hemihydrate to the dihydrate by lowering the temperature and the phosphoric acid concentration. From Belgian Pat. No. 621,425 such a process is known, which process comprises forming active seed twin crystals of calcium sulfate dihydrate by reacting phosphate rock, limestone, slaked lime, calcium silicate, or other calcium compounds with sulfuric acid or a mixture of sulfuric acid and phosphoric acid at a temperature below the temperature of transition of hemihydrate into dihydrate, adding the active seed twin crystals to a slurry of calcium sulfate hemihydrate obtained by the reaction at a temperature above the said transition temperature of sulfuric acid and phosphoric acid on phosphate rock, hydrating the said slurry of calcium sulfate hemihydrate containing the seed crystals and separating the resulting phosphoric acid and byproduct gypsum. In this process the concentration of sulfuric acid in the recrystallization solution is more than 2 percent by weight, so as to avoid the formation of $CaHPO_4 \cdot 2H_2O$ in the gypsum. The total concentration of phosphoric acid (calculated as $P_2O_5$) and sulfuric acid should be kept below 35 percent. Using this technique, easily filterable gypsum crystals are obtained. However, this process yields a rather dilute phosphoric acid solution containing about 30 percent of $P_2O_5$. As a result, a separate step for the removal of water becomes necessary if concentrated phosphoric acid is to be produced.

In another type of process for preparing phosphoric acid and gypsum, the acidulation step is carried out in such a way that calcium sulfate hemihydrate is formed which is thereafter separated from the phosphoric acid and converted into gypsum in a separate step. Thus it has been proposed by Larsson in U.S. Pat. No. 1,836,672 to react phosphate rock, phosphoric acid and sulfuric acid under conditions so as to form coarse-crystalline calcium sulfate hemihydrate, to separate this calcium sulfate hemihydrate from the reaction mixture on a filter and to wash it with a dilute phosphoric acid solution (about 15 percent of $P_2O_5$), thereafter remove it from the filter and convert it to gypsum by recrystallization from dilute phosphoric acid. However, premature conversion of the hemihydrate to gypsum frequently occurs during and/or after the washing on the filter and/or during its transport to the recrystallization vessel, thus causing clogging of the transport conduits. In addition, this accidental crystallization occurs when conditions are unfavorable to proper dihydrate crystal growth. Because both the washing liquid and the recrystallization solution will contain a considerable amount of $P_2O_5$ and impurities originating from the phosphate rock acidulation, the gypsum obtained remains moreover unduly contaminated with phosphate and has poor filtration characteristics.

These disadvantages have been eliminated to a considerable extent by another process known in the art which in a way combines the teaching of the above-cited Belgian Pat. No. 621,425 and U.S. Pat. No. 1,836,672 (Larsson). This process comprises reacting phosphate rock with a first mixture of concentrated phosphoric acid and sulfuric acid to form a slurry of calcium sulfate hemihydrate crystals in a concentrated phosphoric acid solution (40–50 percent of $P_2O_5$), separating said hemihydrate crystals from said phosphoric acid solution and withdrawing the phosphoric acid solution from the process, admixing said hemihydrate crystals with a second mixture of dilute phosphoric acid and sulfuric acid (20–30 percent of $P_2O_5$ and 5–20 percent of $H_2SO_4$), redissolving said hemihydrate crystals in said mixture and precipitating therefrom gypsum crystals, which are separated from the mixture of phosphoric acid and sulfuric acid.

However, in carrying out this process, the phosphoric acid concentration in the recrystallization step is high, namely 20–30 percent. The presence of so high a phosphoric acid level requires a long time for the recrystallization step and accounts for the presence of much phosphate entrapped in and adhering to the gypsum, even though the sulfuric acid concentration in the recrystallization step is maintained at a rather high level of 5–20 percent in order to counteract the inclusion of phosphate in the gypsum. In order to remove the adhering phosphoric acid from the gypsum, a considerable amount of wash water is necessary, which affects the water balance of the process.

There are therefore a number of problems to be solved before an economically satisfactory process can be put into operation. It is an object of the present invention to provide satisfactory solutions to these problems, that is to say, to produce a phosphoric acid of high-$P_2O_5$ and low-sulfuric acid content, a gypsum with good filtration characteristics and low-phosphate content and to yield these products in a shorter time and a more economical manner than heretofore practicable.

DETAILED DESCRIPTION OF THE INVENTION

According to the present invention the objects of the invention are achieved and the above-noted problems are solved in a continuous process for the preparation of phosphoric acid and gypsum, which comprises:

A. acidulating phosphate rock with sulfuric acid or a mixture of phosphoric and sulfuric acids under conditions of temperature and concentration of the reactants to form a slurry of $CaSO_4 \cdot \frac{1}{2}H_2O$ crystals and concentrated phosphoric acid;

B. Separating the $CaSO_4 \cdot \frac{1}{2}H_2O$ crystals from the phosphoric acid;

C. removing at least part of said phosphoric acid as product; and

D. recrystallizing the $CaSO_4 \cdot \frac{1}{2}H_2O$ crystals in an aqueous recrystallization solution containing at least 2 percent by weight of sulfuric acid, calculated as $H_2SO_4$, to form $CaSO_4 \cdot 2H_2O$ crystals;

by an improvement comprising the steps of:

1. removing at least part of the phosphoric acid which adheres to the $CaSO_4 \cdot \frac{1}{2}H_2O$ crystals by washing the $CaSO_4 \cdot \frac{1}{2}H_2O$ crystals with an aqueous washing liquid, the temperature at which the washing is effected being selected so as to prevent the conversion of $CaSO_4 \cdot \frac{1}{2}H_2O$ to $CaSO_4 \cdot 2H_2O$ during the washing step and further, the composition and quantity of the washing liquid being selected so as to prevent the conversion of $CaSO_4 \cdot \frac{1}{2}H_2O$ to $CaSO_4 \cdot 2H_2O$ during the washing step and so as to render that portion of the washing liquid which adheres to the $CaSO_4 \cdot \frac{1}{2}H_2O$ after washing a suitable component for the aqueous recrystallization solution in which the $CaSO_4 \cdot \frac{1}{2}H_2O$ after washing is recrystallized to form $CaSO_4 \cdot 2H_2O$;

2. recrystallization the washed $CaSO_4 \cdot \frac{1}{2}H_2O$ from an aqueous recrystallization solution containing 1–15 percent by weight of phosphoric acid (calculated as $P_2O_5$, and 2–25 percent by weight of sulfuric acid calculated as $H_2SO_4$, whereby crystalline $CaSO_4 \cdot 2H_2O$ is formed; and 3. separating the crystalline $CaSO_4 \cdot 2H_2O$ from the recrystallization solution.

Each of the steps in the foregoing process will now be described in detail.

The acidulation of the phosphate rock with sulfuric acid to form phosphoric acid and calcium sulfate can be carried out in any possible way, provided the conditions are such that calcium sulfate hemihydrate is formed. The phosphate rock and the sulfuric acid are, e.g., mixed at a temperature between 75° and 105° C. One or more phosphoric acid solutions obtained from subsequent stages of the process may be recycled, if desired, to the acidulation reactor. The amounts of phosphate rock, sulfuric acid, phosphoric acid and water to be employed are determined by the requirements for formation of the hemihydrate and also by the desired concentration of the product phosphoric acid.

The temperature of the acidulation reaction may be controlled in several ways. If, for instance, strong sulfuric acid (90–100 percent) is used, this strong sulfuric acid may be mixed with recycled phosphoric acid solution whereby heat is generated causing a temperature rise. When operating under reduced pressure, additional water may be evaporated by the generated heat. Thus, both the sulfuric acid concentration and the temperature are simultaneously controlled. It is also possible to control the temperature by evaporating water by blowing air through the mixture of sulfuric acid and phosphoric acid solution.

The separation of the concentrated phosphoric acid solution and the calcium sulfate hemihydrate formed by the acidulation is generally carried out on a filter, although any other suitable separation method, such as centrifugation, may also be employed. As a filter in most cases, a continuous belt filter is used. Often, the first phosphoric acid filtrate which is obtained, still contains some solid contaminants and has a cloudy appearance. It is therefore recycled to the acidulation reactor. Upon continuation of the filtration the filtrate becomes clear; this clear filtrate is the phosphoric acid solution of the desired concentration, and is withdrawn from the process as one of the products.

The conditions during the separation step should be controlled so as to maintain the calcium sulfate completely in the hemihydrate form.

The conditions under which calcium sulfate hemihydrate is maintained in this crystal form or is converted into another form, such as anhydrite or gypsum, are known to those skilled in the art. Merely by way of example reference may be made to an article of Sven-Eric Dahlgren in Acta Polytechnica Scandinavica Ch. 7 (271/1960), where the equilibria of calcium sulfate crystal forms in acid solutions of various temperatures and various acid concentrations have been discussed.

After the separation of the phosphoric acid solution, the calcium sulfate hemihydrate is washed to remove at least part of the phosphoric acid still adhering to the hemihydrate. The composition and quantity of the washing liquid and the temperature are mainly determined by the dual requirements that: (1) the calcium sulfate hemihydrate crystals should not be transformed into calcium sulfate dihydrate (gypsum) crystals and (2) that the composition and quantity of the liquid remaining in and adhering to the cake of hemihydrate crystals after the washing should be such that the composition of the recrystallization solution to which the cake is transferred, can be properly controlled. Moreover, the washing liquid should not contain any calcium sulfate dihydrate (gypsum) seeds.

Gypsum crystals could be easily formed, if the hemihydrate were simply filtered off and then washed with water or dilute phosphoric acid or sulfuric acid, especially if this diluted acid contains gypsum seed crystals. A considerable amount of phosphate, still present in the cake of hemihydrate crystals in several forms, would then be entrapped in this gypsum. As opposed to the hemihydrate, any prematurely formed gypsum is not redissolved during the subsequent recrystallization step, and the entrapped phosphate will thus not be liberated and is definitely lost. Moreover, seed crystals of gypsum in an undesired form result, which hinder the proper growth of pure gypsum crystals in the subsequent recrystallization. This formation of the gypsum crystals might occur on the filter to such an extent that the cake particles agglomerate and thus include an additional amount of phosphate.

Further, using water or dilute sulfuric acid as a washing liquid is disadvantageous in that the liquor obtained by washing the hemihydrate is so dilute that it is substantially unsuitable for recycling to the acidulation reactor, with the result that the phosphoric acid and sulfuric acid contained therein are lost.

When operating the process of the invention in general a washing liquid having a low water vapor pressure is used, e.g., a solution containing a considerable amount of sulfuric acid. For example, in the continuous process of the invention the mother liquor containing sulfuric acid obtained by filtering off the gypsum crystals formed after the recrystallization of the hemihydrate may be used as a washing liquid. The concentration of sulfuric acid in this mother liquor may be adjusted by admixing fresh strong sulfuric acid. The addition of sulfuric acid increases moreover the amount of washing liquid available for washing the hemihydrate. By a proper selection of the amount and temperature of the admixed strong sulfuric acid and by the use of its heat of dilution it is possible to evaporate a predetermined amount of water from the mixed phases, thus obtaining the desired composition and temperature of the washing liquid. By these measures, any gypsum crystals, which may be present in the mother liquor, are transformed into calcium sulfate hemihydrate crystals. As an expert skilled in the art knows, this is of preponderant importance in plant practice, because spurious gypsum seeds in otherwise stable hemihydrate conditions may cause instability. The desired concentration of sulfuric acid in the washing liquid and the amount thereof can be easily determined by preliminary experiments.

The recycled mother liquor always contains a small amount of phosphoric acid originating from the recrystallization solution and adhering to the filtered gypsum. However, in the practice of the invention the phosphoric acid concentration in the washing liquid is generally lower than the sulfuric acid concentration therein.

By using the washing liquids in accordance with the invention it is possible to obtain after washing the hemihydrate, a liquor which may conveniently be recycled to the acidulation reactor, thereby avoiding losses of phosphoric acid and sulfuric acid. For example, the phosphoric acid and sulfuric acid separated from the gypsum in the final filtration step of the process of the invention are recycled to the hemihydrate filtering and washing step and from there are passed either to the recrystallization step or to the acidulation step.

It should be noted that Peet, in U.S. Pat. No. 2,885,264 teaches a process for the production of strong phosphoric acid of at least 40 percent $P_2O_5$ concentration which comprises reacting phosphate rock with strong aqueous phosphoric acid of at least 40 percent $P_2O_5$ content in a digesting step at temperatures of at least 80° C. and introducing the resulting monocalcium phosphate solution into a first precipitating and crystallizing step along with sulfuric acid and additional phosphoric acid, said sulfuric acid being added in said precipitating and crystallizing step in amounts from 1.5 to 3 percent less than the stoichiometric equivalent of the monocalcium phosphate, precipitating about 85 to 90 percent of the calcium sulfate as hemihydrate, maintaining therein a temperature of at least 80° C. and a phosphoric acid concentration of at least 40 percent $P_2O_5$ thereby forming a suspension of smooth and easily filterable calcium sulfate hemihydrate crystal agglomerates in phosphoric acid which also contains the remaining monocalcium phosphate, recovering a portion of the phosphoric acid containing calcium sulfate hemihydrate crystal agglomerates in suspension and recycling said portion to said initial digestion step, passing the remaining portion of the phosphoric acid with suspended calcium sulfate hemihydrate crystal agglomerates to a second precipitation and crystallization step and reacting said remaining portion of the monocalcium phosphate with additional sulfuric acid sufficient to precipitate the remaining soluble calcium as calcium sulfate, and separating the thus produced strong phosphoric acid of at least 40 percent $P_2O_5$ content from the precipitated calcium sulfate by filtration. Peet does not teach the conversion of the calcium sulfate hemihydrate crystals into gypsum crystals nor does he teach an integrated process in which both steps succeed in the way as set forth hereinabove. Moreover, the calcium sulfate hemihydrate crystals produced according to the process of Peet are so stable that they are not easily recrystallized in contact with enough water at a temperature below 70° C.

The composition of the recrystallization solution, to which the hemihydrate crystals are transferred after washing, can be properly controlled by the composition and quantity of the washing liquid for the hemihydrate crystals, as referred to above. As will be illustrated hereinafter, there is a preferred range for the phosphoric acid and sulfuric acid content in the recrystallization solution. Since the hemihydrate crystal cake contains entrapped and adhering phosphate, the phosphoric acid and sulfuric acid, which are transferred with the cake to the recrystallization solution, the composition and quantity of the washing liquid will determine the percentages of these ingredients which are present in this recrystallization solution. Since after the recrystallization, the mother liquid obtained by filtering off the gypsum crystals formed is generally recycled to the acidulation reactor or to the recrystallization solution and/or as part of the said washing liquid, it is clear that by controlling the amount and composition of the liquid transferred with the hemihydrate crystals to the recrystallization solution, an important contribution to a favorable balance of all substances used all over the plant can be obtained. The composition of the washing liquid for the hemihydrate crystals on the filter is of course also dependent on the manner of acidulation, which determines the composition of the phosphoric acid adhering to the hemihydrate crystals, and on the temperature during the washing of the hemihydrate on the filter.

To avoid inclusion of phosphate in the gypsum during the recrystallization of the hemihydrate into gypsum, the recrystallization temperature should be preferably as high as possible and the phosphate ion concentration as low as possible and such will be illustrated below. On the other hand, it has been found that a certain minimum amount of phosphate ion in the recrystallization solution improves the filterability and washability of the resulting gypsum. If the acidulation of the phosphate rock results in the formation of a calcium sulphate hemihydrate filtercake in which are entrapped so little phosphate acid and phosphate, that after washing the filter cake with the washing liquid according to the invention this minimum amount of phosphate ion is not present, the washing of the filter cake should be discontinued before all adhering phosphoric acid is removed from the filter cake thereby allowing some of the adhering acid to come into the recrystallization solution.

The following experiments have been carried out to determine the preferred composition of the recrystallization solution. It should be noted that these preferred compositions do not represent actual working examples of the process in the plant, but rather are workbench experiments performed only to determine optimum or ideal conditions.

EXPERIMENT 1

350 cm.$^3$ of each of aqueous solutions A, B, C and D, the compositions of which are found in table 1 are maintained at various fixed temperatures. Into each of these 350 cm.$^3$ solutions are added 50 gm. of $CaSO_4 \cdot 2H_2O$ crystals containing various small amounts of total phosphate (calculated as $P_2O_5$), which serve as seed crystals. To each of the resulting slurries are added 100 gm. of $CaSO_4 \cdot \frac{1}{2}H_2O$ containing various amounts of $P_2O_5$. Each of the mixtures is then left to recrystallize for two hours at its predetermined temperature and the $P_2O_5$-content, and the water of crystallization of the recrystallized sulphate are then determined. The results are shown in table 1.

TABLE 1

| Recrystallization solution [1] | A | | | | B | | | | C | | | | D | | | | | | |
|---|---|---|---|---|---|---|---|---|---|---|---|---|---|---|---|---|---|---|---|
| Temperature, °C | 50 | 60 | 70 | 80 | 40 | 50 | 60 | 70 | 80 | 50 | 60 | 70 | 80 | 40 | 50 | 60 | 70 | 80 | 80 | 80 |
| Percent $P_2O_5$ in seed crystals | 0.17 | 0.17 | 0.17 | 0.17 | 0.35 | 0.35 | 0.44 | 0.44 | 0.38 | 0.17 | 0.17 | 0.17 | 0.17 | 0.38 | 0.34 | 0.21 | 0.21 | 0.24 | 0.09 | 0.03 |
| Percent $P_2O_5$ in gypsum product [2] | 0.40 | 0.37 | 0.26 | 0.23 | 0.44 | 0.38 | 0.34 | 0.26 | 0.24 | 0.23 | 0.19 | 0.15 | 0.14 | 0.21 | 0.24 | 0.13 | 0.09 | 0.09 | 0.03 | 0.05 |
| Percent water of crystallization in gypsum product | 20.3 | 20.3 | 19.8 | 20.3 | 20.7 | 20.3 | 20.0 | 19.8 | 18.2 | 20.4 | 20.3 | 20.1 | 19.8 | 20.2 | 20.0 | 19.9 | 20.4 | 10.8 | 19.8 | 19.8 |

NOTES:
[1] Percentage of $P_2O_5$ and sulfate in recrystallization solutions.

| Percent | $P_2O_5$ | $SO_4$ |
|---|---|---|
| A | 14.7 | 5.5 |
| B | 9.8 | 9.5 |
| C | 5.2 | 15.2 |
| D | 0 | 18.8 |

[2] Determined after two hours.

EXPERIMENT 2

This experiment is performed in the same manner as experiment 1 but with the temperature maintained at 70° C. and with other percentages of $P_2O_5$ and sulfate ion in the recrystallization solution. In this experiment the percentage of $P_2O_5$ was maintained substantially constant with a varying percentage of sulfate ion, or was varied with substantially constant sulfate content. The results are shown in table II. In the last column the percentage of $P_2O_5$ in the gypsum is given after a recrystallization time of 2 hours.

TABLE II

| recrystallization solution % $P_2O_5$ | recrystallization solution % $SO_4^{--}$ | % of $P_2O_5$ in gypsum product |
|---|---|---|
| 4.9 | 0.1 | 0.79 |
| 5.0 | 5.1 | 0.24 |
| 4.9 | 10.0 | 0.14 |
| 5.0 | 15.0 | 0.13 |
| 4.9 | 19.6 | 0.09 |
| 0 | 2.0 | 0.32 |
| 4.9 | 2.2 | 0.46 |

| | | |
|---|---|---|
| 10.7 | 2.8 | 0.51 |
| 14.5 | 2.8 | 0.43 |
| 19.5 | 3.0 | 0.46 |
| | | |
| 0 | 4.8 | 0.19 |
| 4.9 | 5.2 | 0.30 |
| 9.6 | 5.5 | 0.33 |
| 14.5 | 5.6 | 0.30 |
| 19.3 | 6.0 | 0.27 |

These experiments show that the phosphoric acid content in the recrystallization solution should be kept as low as possible so as to avoid contamination of the resulting gypsum with an undue amount of phosphate. If under any circumstances the phosphoric acid concentration is too high, a more elevated sulphuric acid concentration may be helpful in obtaining a low-$P_2O_5$-content in the gypsum. The total amount of acid, however, should not be so high that unduly long recrystallization times are required. As furthermore the sulphuric acid concentration is essential for obtaining gypsum with a low-$P_2O_5$-content, the only way of keeping the acid level low is to minimize the amount of $P_2O_5$, which enters the recrystallization step.

In general the recrystallization solution is used is an aqueous solution containing from 1 to 15 percent by weight of $P_2O_5$ and from 2 to 25 percent by weight of $H_2SO_4$. Preferably, the amount of $P_2O_5$ is from 1 to 10 percent and especially from 3 to 10 percent and the amount of $H_2SO_4$ is from 5 to 15 percent. The recrystallization temperature is preferably kept below 90° C. and may be gradually decreased as the recrystallization proceeds, e.g., by maintaining a temperature gradient in the recrystallization step.

It is known in general crystallization techniques that the proper form and quantity of seed crystals may have a beneficial influence on crystallization. This beneficial influence may be lost if there are impurities present. In the process of the invention, however, impurities, originating from the phosphate rock have been removed to a great extent by the filtration and washing of the hemihydrate crystals. Thus the recrystallization solution is substantially free from such impurities, thereby making it possible to utilize the beneficial action of proper seed crystals to its full advantage. The deleterious effect which impurities have on crystallization makes it clear why the prevention of the untimely formation of gypsum during the washing of the hemihydrate crystals as previously described, is so important. Proper gypsum seed crystals may be prepared e.g., by separate recrystallization of part of the hemihydrate. Alternatively, gypsum crystals obtained by an earlier recrystallization in the process may be recirculated and added as seed crystals.

After the recrystallization has been completed the gypsum crystals are separated from the mother liquor, e.g., by means of filtration. Preferably, the molten liquid is recycled to an earlier stage of the process, e.g., to form part of the washing liquid for the hemihydrate crystals, and/or to the recrystallization solution. In general, the gypsum crystals are washed with water, preferably countercurrently, i.e., by recycling the last filtrate to wash another portion of gypsum. The resulting washing liquor is preferably recycled to the recrystallization solution and the gypsum crystals are withdrawn.

The process of the invention permits economic use of sulfuric acid. The sulfuric acid is in fact used to replace the calcium in the phosphate-starting material by hydrogen and to form calcium sulfate. Thus the main consumption of sulfuric acid takes place in the acidulation reaction, to which the major part of the sulfuric acid supply is fed. However, sulfuric acid is also used for the washing of the hemihydrate crystals. None being consumed in the washing operation, it must be recovered to avoid losses. The recovery is effected by recycling the washing liquor to the acidulation reactor as described above, where the sulfuric acid in the washing liquor is consumed in the acidulation reaction. The sulfuric acid adhering to the hemihydrate after washing reacts during the recrystallization with unreacted or partially reacted phosphate rock entrapped in the hemihydrate which is released therefrom by the dissolution of the hemihydrate in the recrystallization solution. If desired, additional fresh strong sulfuric acid may be added to said solution in order to obtain or to maintain a sulfuric acid concentration which is desirable for optimum gypsum yield during the recrystallization. If too much sulfuric acid has entered the recrystallization solution, the sulfuric acid concentration thereof can be reduced to the desired level by introducing a greater portion of the mother liquor obtained by filtering off the gypsum crystals into the washing liquid for the hemihydrate wash, whence it is returned to the acidulation vessel. Sulfuric acid is withdrawn from the process for the most part in the form of gypsum and only slightly as free sulfuric acid in the phosphoric acid product.

Water is introduced toward the end of the process as wash water for the gypsum crystal cake. Part of this water is lost in the cake and part is evaporated in various steps of the process, e.g., when mixing strong sulfuric acid with recycled phosphoric acid solution before the sulfuric acid is used for the acidulation reaction and when used strong sulfuric acid as part of the washing liquid for the hemihydrate crystals. Thus it is possible to control the temperature at various steps in the process by properly balancing the amount of water, the amount of sulfuric acid, and the concentration of sulfuric acid to be used in these steps. In an industrial process it is convenient to use as a sulfuric acid for the process concentrated sulfuric acid. This makes it possible to evaporate much water in the various steps. As water is added to the process only as wash water for the gypsum, this means moreover that the gypsum can be washed out more thoroughly without losses of useful acid as the wash water can be recycled to earlier steps in the process without loading those steps with too much water. Finally, water may also evaporate during the acidulation reaction and during recrystallization using the heat of reaction and dilution.

Taking into account the water streams of the complete process, another reason for avoiding high concentration of phosphoric acid in the recrystallization solution becomes apparent. For, by high concentrations of this acid in this solution, a considerable amount will adhere to the gypsum cake and must be washed away. For that purpose, much water is needed, which cannot suitably be removed thereafter from the process by evaporation only. Thus it can only be withdrawn in the phosphoric acid product phase, making this product too dilute, however.

According to the process of this invention, hot sulfuric acid may also be used, which advantage is not possible when phosphate rock is acidulated with the immediate formation of gypsum, as in prior processes. The advantage of using hot sulfuric acid lies in the fact that additional water may be removed from the system by evaporation.

According to the invention it is possible to produce phosphoric acid solutions containing more than 30 percent by weight of $P_2O_5$, e.g., containing 40 percent by weight or even more, the sulfuric acid content being low, e.g., less than about 1.5 percent by weight and often less than 1 percent by weight.

The gypsum crystals prepared according to the process of the invention have excellent filtration characteristics and have a phosphate content of less than 0.3 percent by weight, calculated as $P_2O_5$, and generally still lower, e.g., less than 0.2 percent. In the gypsum the content of fluorine originating from the phosphate rock is generally below 0.2 percent by weight.

Another advantage of the process of the invention is that it only takes 2 to 3 hours before a certain portion of phosphate rock is converted into phosphoric acid and gypsum. According to previously known processes this reaction period is 4 to 12 hours.

An embodiment of the process of the invention will now be described by way of example with reference to the accompanying drawings, in which:

FIG. 1 is a flow scheme of a plant for the production of phosphoric acid and gypsum according to the invention; and FIG. 2 is a flow scheme of a modified plant.

According to the flow scheme of FIG. 1, phosphate rock and sulfuric acid are fed into acidulation reactor 1 through conduits 2 and 3 respectively. Through conduits 4 and 5 phosphoric acid phases from subsequent steps in the process are recycled to reactor 1.

If it is desired in the process to adjust the temperature in acidulation reactor 1 by cooling, preferably by evaporation cooling, e.g., by a flash-cooling system or by blowing air in the liquid, it is convenient to effect this cooling at a point where fresh sulfuric acid and the recycled phosphoric acid phases are mixed. This is illustrated in FIG. 2, where the phosphoric acid phases carried through conduits 4 and 5 are wholly or partly mixed with the fresh sulfuric acid and passed through a suitable cooler A before being introduced into reactor 1.

If desired, the phosphate rock may be wetted by part of these phosphoric acid phases before being introduced into reactor 1. Vigorous mixing during this wetting step is desirable.

The acidulation in reactor 1 is carried out under such conditions that phosphoric acid and calcium sulfate hemihydrate are formed. The effluent from reactor 1 which contains the phosphoric acid and calcium sulfate hemihydrate, is passed through conduit 6 to a separating apparatus 7, e.g., a filter, such as a continuous belt filter. Such filters are known to produce as a first part of the filtrate a not wholly clean phosphoric acid filtrate resulting from entrainment of insoluble material through the filter cloth prior to cake formation thereon. This so-called "cloudy"filtrate fraction is recycled to reactor 1 through conduits 5. As a second filtrate fraction the phosphoric acid desired as a product is obtained, the concentration of which can be controlled by adjustment of the conditions of the acidulation reaction. This phosphoric acid product is withdrawn from the filter through conduit 8. Then the calcium sulfate hemihydrate crystals, from which the greater part of the phosphoric acid phase has now been removed, are washed with a liquid phase partly originating from the subsequent recrystallization step in the process as described above, which liquid phase is added through conduit 9.

The composition and temperature of this washing liquid may be adjusted by adding through conduit 14 fresh-concentrated sulfuric acid to the liquid from the recrystallization step and cooling the mixture by passing it through an evaporating cooler B as shown in FIG. 2, before using the mixture as washing liquid on filter 7.

Part of the washing liquid is withdrawn from the filter through conduit 4 and recycled to acidulation reactor 1, if desired after removal of part of its water content in a flasher A (see FIG. 2). The filter cake of calcium sulfate hemihydrate with adhering liquid is then transferred from filter 7 through conduit 10 to recrystallization vessel 11. In this vessel the calcium sulfate hemihydrate is recrystallized to form calcium sulfate dihydrate (gypsum) crystals. The suitable water and sulfuric acid content in this vessel may be maintained at a desired level by recirculation of part of the liquid obtained by filtering the resulting gypsum crystals through conduits 12 and 13 and by adding fresh sulfuric acid through conduits 3, 14 and 15, if necessary. After the recrystallization has been completed, the mass containing the gypsum crystals is withdrawn from vessel 11 through conduit 16 and is fed to filter 17.

Part of stream 16 may be recycled to vessel 11 to insure proper backfeed to seed crystals. From filter 17 part of the filtrate is withdrawn through conduit 12. This filtrate may be recycled, if desired, to recrystallization vessel 11 through conduit 12 and/or to filter 7 through conduits 12 and 9. The phase which is recycled to filter 7 may be mixed with additional sulfuric acid supplied through conduits 3 and 14. The gypsum crystals are washed on the filter 17 with water added through conduit 18 and then withdrawn from the filter at 19. The washing filtrate containing a small amount of sulfuric acid is recycled to the recrystallization vessel through conduit 13. It may be of advantage to carry out an extra wash on filter 17, e.g., by using the last filtrate obtained from filter 17, which is recycled through conduit 20 as indicated in FIG. 2.

A continuous process which may be carried out in the apparatuses shown in FIG. 1 and FIG. 2 will now be illustrated in more detail in the following examples without restricting the invention to the embodiments described therein. The amounts referred to in the examples are the amounts passed through the apparatus in 1 hour.

EXAMPLE 1

Using the apparatus shown in FIG. 2, 1,000 kg. of Kourighaphosphate rock containing 51.2 percent CaO and 33.6 percent $P_2O_5$ and 467 kg. of $H_2SO_4$ as 98 percent sulfuric acid are added continuously through conduits 2 and 3 respectively to reactor 1, the temperature of which is maintained at about 90° C. Through conduit 5, 2,300 kg. of a solution containing 40 percent phosphoric acid, calculated as $P_2O_5$, and 1 percent $H_2SO_4$ are recycled to reactor 1, through conduit 4 1,095 kg. of a solution containing 3.3 percent phosphoric acid, calculated as $P_2O_5$, and 36.2 percent $H_2SO_4$ are recycled to reactor 1. The water content in the acidulation reactor is adjusted by evaporation of 166 kg. of $H_2O$ in A. Calcium sulfate hemihydrate is formed in reactor 1, from which another portion of 41 kg. of $H_2O$ evaporates, and transported to filter 7. Phosphoric acid having a $P_2O_5$ content of 40 percent and an $H_2SO_4$ content of 1 percent is withdrawn from filter 7 through conduit 8 in an amount of 821 kg. 1,180 kg. of recycle liquid containing 15.0 percent $H_2SO_4$ and 2.19 percent phosphoric acid, calculated as $P_2O_5$, fed through conduits 12 and 9 are mixed with 448 kg of $H_2SO_4$ as a 98 percent sulfuric acid supplied through conduit 14. Using the resultant heat of mixture, 200 kg. of $H_2O$ are evaporated in B from the mixture before this is used as washing liquid through conduit 9 on filter 7.

After having been washed, the filter cake of calcium sulfate hemihydrate crystals is withdrawn from the filter 7 through conduit 10 to vessel 11. It contains 1,252 kg. of $CaSO_4 \cdot \frac{1}{2}H_2O$, 583 kg. of water, 25 kg. of $P_2O_5$ and 221 kg. of $H_2SO_4$.

Through conduit 12, 976 kg. of a solution containing 15.0 percent $H_2SO_4$ and 2.19 percent phosphoric acid, calculated as $P_2O_5$, are recycled to vessel 11; through conduit 13, 1,273 kg. of a solution containing 0.49 percent phosphoric acid, calculated as $P_2O_5$, and 3.4 percent $H_2SO_4$ are recycled to vessel 11. The recrystallization temperature was 70° C. Fresh sulfuric acid was not supplied. The suspension of the gypsum crystals, formed in vessel 11, from which an additional portion of 125 kg. of $H_2O$ evaporates, was filtered on filter 17 and washed with 1,273 kg. of water. From filter 17, 1,564 kg. of gypsum containing 0.15 percent $P_2O_5$ on a dry basis (drying at 60° C.) and 20.1 percent water of crystallization were withdrawn. The $P_2O_5$ figure is very low and completely acceptable considering the fact that the phosphoric acid produced contains 40 percent of $P_2O_5$.

EXAMPLE 2

Using the same continuous procedure as in example 1 but with the use of the apparatus shown in FIG. 1, a 47 percent phosphoric acid is produced as follows. 1,000 kg. of phosphate rock containing 51.2 percent CaO and 33.6 percent $P_2O_5$ and 733 kg. of $H_2SO_4$ as 98 percent sulfuric acid are fed to reactor 1 through conduits 2 and 3 respectively. 6,100 kg. of a solution of 47 percent $P_2O_5$ and 1.2 percent $H_2SO_4$ are recycled through conduit 5 and 514 kg. of a solution of 3.5 percent $P_2O_5$ and 25.3 percent $H_2SO_4$ are recycled through conduit 4. Through conduit 8, 708 kg. of phosphoric acid of 47 percent $P_2O_5$ and 1.2 percent $H_2SO_4$ are withdrawn from filter 7. The washing liquid added to the filter through conduit 9 consists of a mixture of 182 kg. of $H_2SO_4$ supplied through conduits 3 and 14 and 1,435 kg. of a solution of 4 percent $P_2O_5$ and 16 percent $H_2SO_4$ recycled from filter 17 through conduit 12 to conduit 9. From filter 7 a filter cake containing 1,247 kg. of calcium sulfate hemihydrate is withdrawn through conduit 10 into vessel 11. This filter cake further contains 22 kg. of $P_2O_5$ and 278 kg. of $H_2SO_4$. Through conduit 12, 1,435 kg. of a solution of 4 percent $P_2O_5$ and 16 percent $H_2SO_4$ and through conduit 13, 850 kg. of a solution of 2 percent $P_2O_5$ and 8 percent $H_2SO_4$ are recycled to recrystallization vessel 11, the temperature of which is maintained at about 70° C. From vessel 11 the gypsum suspension is fed to filter 17 and washed with 890 kg. of water through conduit 18. From filter 17, 1,560 kg. of gypsum containing 0.22 percent $P_2O_5$ on a dry basis (drying at 60° C.) and 20.2 percent water of crystallization are withdrawn. The $P_2O_5$ figure is very low considering the fact that the phosphoric acid produced contains 47 percent of $P_2O_5$.

EXAMPLE 3

Using the procedure and the phosphate rock described in example 2, the following process is carried out.

One thousand kg. of phosphate rock and 600 kg. of $H_2SO_4$ as 98 percent sulfuric acid are fed through conduits 2 and 3 respectively to reactor 1, the temperature of which is maintained at about 90° C. 921 kg. of a solution of 47 percent $P_2O_5$ and 1.2 percent $H_2SO_4$ are recycled through conduit 5 and 1,525 kg. of a solution of 31 percent $P_2O_5$ and 11 percent $H_2SO_4$ are recycled through conduit 4. From reactor 1, 178 kg. of water evaporate. Through conduit 8, 676 kg. of a phosphoric acid of 47 percent $P_2O_5$ and 1.2 percent $H_2SO_4$ are withdrawn from filter 7. The washing liquid added to the filter through conduit 9 consists of a mixture of 281 kg. of $H_2SO_4$ as 98 percent sulfuric acid, supplied through conduits 3 and 14, and 1,259 kg. of a solution of 9.2 percent $P_2O_5$ and 6.5 percent $H_2SO_4$ recycled from filter 17 through conduit 12 to conduit 9. From filter 7 a filter cake of 2,236 kg. is withdrawn through conduit 10 into vessel 11. This filter cake consists of 1,342 kg. solid substance, 588 kg. $H_2O$, 213 kg. $H_2SO_4$ and 93 kg. $H_3PO_4$. Through conduit 12, 2,780 kg. of a solution of 9.2 percent $P_2O_5$ and 6.5 percent $H_2SO_4$ and through conduit 13, 1,814 kg. of a solution of 5.5 percent $P_2O_5$ and 3.9 percent $H_2SO_4$ are recycled to recrystallization vessel 11, the temperature of which is maintained at about 70° C. From vessel 11, 70 kg. of $H_2O$ evaporate. A gypsum suspension is fed from vessel 11 to filter 17 and washed with 1,814 kg. of $H_2O$ through conduit 18. From filter 17, 2,750 kg. of a filter cake containing 1,650 kg. of solid substance are withdrawn. The gypsum obtained contains 0.19 percent by weight of $P_2O_5$ on a dry basis (drying at 60° C.).

EXAMPLE 4

Using the procedure and the phosphate rock of example 2 the following process is carried out.

1,000 kg. of phosphate rock and 416 kg. of $H_2SO_4$ as 98 percent sulfuric acid are fed through conduits 2 and 3 respectively to reactor 1, the temperature of which is maintained at about 90° C. 574 kg. of a solution of 40 percent $P_2O_5$ and 1 percent $H_2SO_4$ are recycled through conduit 5 and 1,870 kg. of a solution of 21 percent $P_2O_5$ and 22 percent $H_2SO_4$ are recycled through conduit 4. From reactor 1, 163 kg. of $H_2O$ evaporate. Through conduit 8, 796 kg. of a phosphoric acid of 40 percent $P_2O_5$ and 1 percent $H_2SO_4$ are withdrawn from filter 7. The washing liquid added to the filter through conduit 9 consists of a mixture of 466 kg. $H_2SO_4$ as a 98 percent sulfuric acid, supplied through conduits 3 and 14, and 1,440 kg. of a solution of 3.5 percent $P_2O_5$ and 21.4 percent $H_2SO_4$ recycled from filter 17 to conduit 9. From filter 7 a filter cake of 2,284 kg. is withdrawn through conduit 10 into vessel 11. This filter cake contains 1,370 kg. of solid substances, 502 kg. of $H_2O$, 378 kg. of $H_2SO_4$ and 34 kg. of $H_3PO_4$. Through conduit 12, 2,598 kg. of a solution of 3.5 percent $P_2O_5$ and 21.4 percent $H_2SO_4$ and through conduit 13, 1,960 kg. of a solution of 12 percent $H_2SO_4$ and 1.95 percent $P_2O_5$ are recycled to recrystallization vessel 11, the temperature of which is maintained at about 70° C. From this recrystallization vessel 95 kg. of $H_2O$ evaporate. A gypsum suspension is fed from vessel 11 to filter 17 and washed with 2,073 kg. of water through conduit 18. From filter 17 a filter cake of 2,750 kg. containing 1,650 kg. of solid substances is withdrawn. The gypsum contains 0.14 percent by weight of $P_2O_5$ on a dry basis (drying at 60° C.).

What is claimed is:

1. In a continuous process for the preparation of phosphoric acid and gypsum which comprises the steps of:

A. acidulating phosphate rock with sulfuric acid or a mixture of phosphoric acid and sulfuric acid under conditions of temperature and concentration to form a slurry of $CaSO_4 \cdot 1/2H_2O$ crystals and concentrated phosphoric acid;

B. separating the $CaSO_4 \cdot \frac{1}{2}H_2O$ crystals from the phosphoric acid;

C. removing at least part of said phosphoric acid as product; and

D. recrystallizing the $CaSO_4 \cdot \frac{1}{2}H_2O$ crystals in an aqueous recrystallization solution containing at least 2 percent by weight of sulfuric acid, calculated as $H_2SO_4$, to form $CaSO_4 \cdot 2bH_2O$ crystals;

an improvement comprising the steps of:

1. removing at least a part of the phosphoric acid which remains in and adheres to the $CaSO_4 \cdot \frac{1}{2}H_2O$ crystals by washing said $CaSO_4 \cdot \frac{1}{2}H_2O$ crystals with an aqueous washing liquid containing, in percent by weight, about 23-43 percent of sulfuric acid and about 1.8-7.5 percent of phosphoric acid, calculated as $P_2O_5$, under conditions to prevent the conversion of $CaSO_4 \cdot \frac{1}{2}H_2O$ to $CaSO_4 \cdot 2H_2O$ during the washing step and further so as to render that portion of the aqueous washing liquid which adheres to the $CaSO_4 \cdot \frac{1}{2}H_2O$ after washing a suitable component for the aqueous recrystallization solution;

2. recrystallizing the washed $CaSO_4 \cdot \frac{1}{2}H_2O$ in an aqueous recrystallization solution containing 1-15 percent by weight of phosphoric acid (calculated as $P_2O_5$), and 2-25 percent by weight of sulfuric acid calculated as $H_2SO_4$, to thereby form crystalline $CaSO_4 \cdot 2H_2O$; and 3. separating the crystalline $CaSO_4 \cdot 2H_2O$ from the recrystallization solution.

2. A process as claimed in claim 1 wherein an aqueous washing liquid containing sulfuric acid and having a low-water vapor pressure is used during the washing step.

3. A process as claimed in claim 2 wherein the sulfuric acid is concentrated sulfuric acid.

4. A process as claimed in claim 2 wherein the sulfuric acid is concentrated sulfuric acid and the aqueous washing liquid is cooled through evaporation.

5. A process as claimed in claim 1 wherein a part of the recrystallization solution from which recrystallized $CaSO_4 \cdot 2H_2O$ is removed comprises part of the aqueous washing liquid.

6. A process as claimed in claim 5 wherein prior to the washing of $CaSO_4 \cdot \frac{1}{2}H_2O$, water is evaporated from the part of the crystallization solution used as part of the aqueous washing liquid after the addition of concentrated sulfuric acid thereto.

7. A process as claimed in claim 5 wherein the phosphoric acid concentration in the aqueous washing liquid is lower than the sulfuric acid concentration therein.

8. A process as claimed in claim 1 wherein after washing $CaSO_4 \cdot 1/2H_2O$ the aqueous washing liquid is recycled to the acidulation step and comprises part of the phosphoric acid used in acidulating phosphate rock.

9. A process as claimed in claim 1 wherein the aqueous recrystallizing solution contains from 1 to 10 percent by weight of phosphoric acid (calculated as $P_2O_5$) and from 5 to 15 percent by weight of sulfuric acid calculated as $H_2SO_4$.

10. A process as claimed in claim 1 wherein the aqueous recrystallizing solution contains 3 to 10 percent by weight of phosphoric acid (calculated as $P_2O_5$) and from 5 to 15 percent by weight of sulphuric acid calculated as $H_2SO_4$.

11. A process as claimed in claim 1 whereby recrystallization of $CaSO_4 \cdot 2H_2O$ is promoted by adding seed crystals of $CaSO_4 \cdot 2bH_2O$.

12. A process as claimed in claim 11 wherein the seed crystals are prepared by separately recrystallizing a portion of the $CaSO_4 \cdot \frac{1}{2}H_2O$.

13. A process as claimed in claim 1 wherein a part of the crystalline $CaSO_4 \cdot 2H_2O$ is recycled to the recrystallization solution, whereby the formation of $CaSO_4 \cdot 2H_2$ from $CaSO_4 \cdot \frac{1}{2}H_2O$ is promoted.

14. A process as claimed in claim 1 wherein the recrystallization is effected at a temperature below 90° C.

15. A process as claimed in claim 14 wherein the temperature is gradually lowered as the recrystallization proceeds.

16. A process as claimed in claim 1 wherein the $CaSO_4 \cdot 2H_2O$ is washed countercurrently with water, the resulting filtrate thereafter being recycled to the recrystallization solution.

17. A process as claimed in claim 1 wherein a part of the starting amount of sulfuric acid is used for acidulating phosphate rock, a part is used for washing the $CaSO_4 \cdot \frac{1}{2}H_2O$ and a part is used as a component of the recrystallization solution.

18. A process as claimed in claim 17 wherein hot concentrated sulfuric acid is used.

19. A process as claimed in claim 1 wherein prior to the acidulation of phosphate rock, sulfuric acid and an aqueous solution containing phosphoric acid recycled from a further step of the process are mixed, and water is evaporated therefrom, thereby reducing the temperature of the mixture, said mixture thereafter being used to control the temperature during the acidulation of phosphate rock.

20. A process as claimed in claim 1 wherein the aqueous washing liquid is a solution consisting of 23.2–43.1 percent by weight of sulfuric acid and 1.8–7.5 percent by weight of phosphoric acid, calculated as $P_2O_5$.

* * * * *